May 4, 1948.   W. D. TEAGUE, JR   2,441,089
AIRCRAFT CABIN PRESSURE CONTROL MEANS
Filed May 16, 1944   2 Sheets-Sheet 1
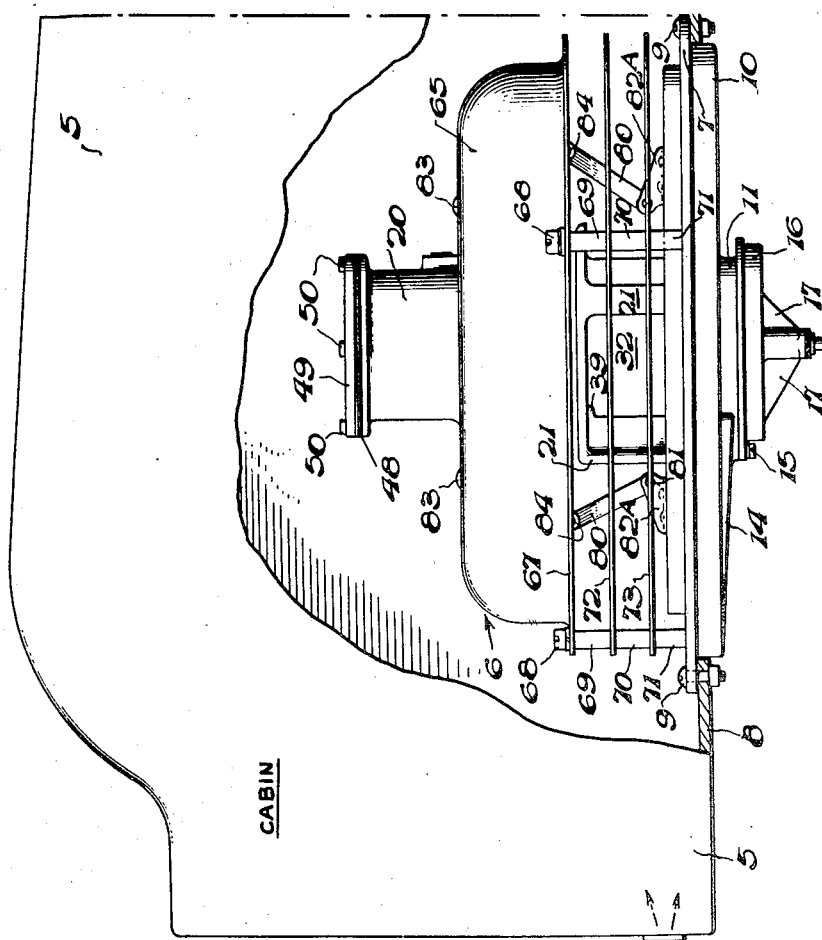
Fig. 1.
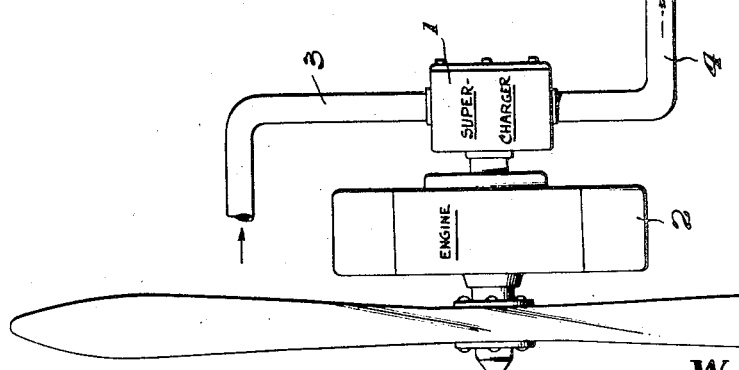
INVENTOR.
Walter D. Teague, Jr.
BY
Herbert L. Davis, Jr.
ATTORNEY Patented May 4, 1948

2,441,089

UNITED STATES PATENT OFFICE 2,441,089

AIRCRAFT CABIN PRESSURE CONTROL MEANS

Walter D. Teague, Jr., Alpine, N. J., assignor to Bendix Aviation Corporation, Teterboro, N. J., a corporation of Delaware Application May 16, 1944, Serial No. 535,867

6 Claims. (Cl. 98—1.5)

This invention relates to novel and improved control means, methods and systems for maintaining air at suitable predetermined pressures in a closed or sealed compartment of an aircraft and more particularly to improvements in an air inlet and outlet control mechanism and valve and in methods and systems for regulating the pressure within an aircraft cabin of a type such as shown, for example, in the U. S. Patent No. 2,002,057 to Gregg, dated May 21, 1935. The present application is a continuation in part of my copending application Serial No. 524,063, filed February 26, 1944.

An object of my present invention is to provide novel means for regulating the air pressure within an aircraft cabin so as to prevent such cabin pressure from dropping below a predetermined pressure value relative to atmospheric pressure.

Another object of my invention is to provide a novel system and means for maintaining aircraft cabin pressure between predetermined minimum and maximum values relative to atmospheric pressure.

Another object of my invention is to provide a novel system and means for increasing aircraft cabin pressure to a predetermined maximum value above atmospheric pressure and so controlling such pressure during aircraft maneuvers as to prevent such cabin pressure from decreasing below a predetermined minimum value relative to atmospheric pressure.

Another object of my invention is to provide novel means whereby aircraft cabin pressure may be limited to a maximum differential above atmospheric pressure and also to prevent cabin pressure from dropping substantially below atmospheric pressure regardless of the maneuvers of the aircraft.

Another object of my invention is to provide a novel method and system for supercharging an aircraft cabin and limiting such supercharged pressure to a maximum differential above atmospheric pressure, and preventing such cabin pressure from decreasing below a safe predetermined value relative to the atmospheric pressure at the flight level of the aircraft.

Another object of my invention is to provide in a single housing a pressure relief valve, together with a vacuum relief valve for regulating the value of the pressure within an aircraft cabin relative to the atmospheric pressure at the level of flight of the aircraft.

The above and further objects and novel features of this invention will more fully appear from the following detailed description and the accompanying drawings wherein like reference characters refer to like parts in the several views. It is to be expressly understood, however, that the drawings are for the purposes of illustration only and are not designed as a definition of the limits of the invention, reference being had for this purpose to the appended claims.

In the drawings.

Figure 1 is a schematic view illustrating my novel system and method for pressurizing an aircraft cabin and showing a somewhat enlarged exploded side view of the cabin pressure control mechanism.

Figure 2:
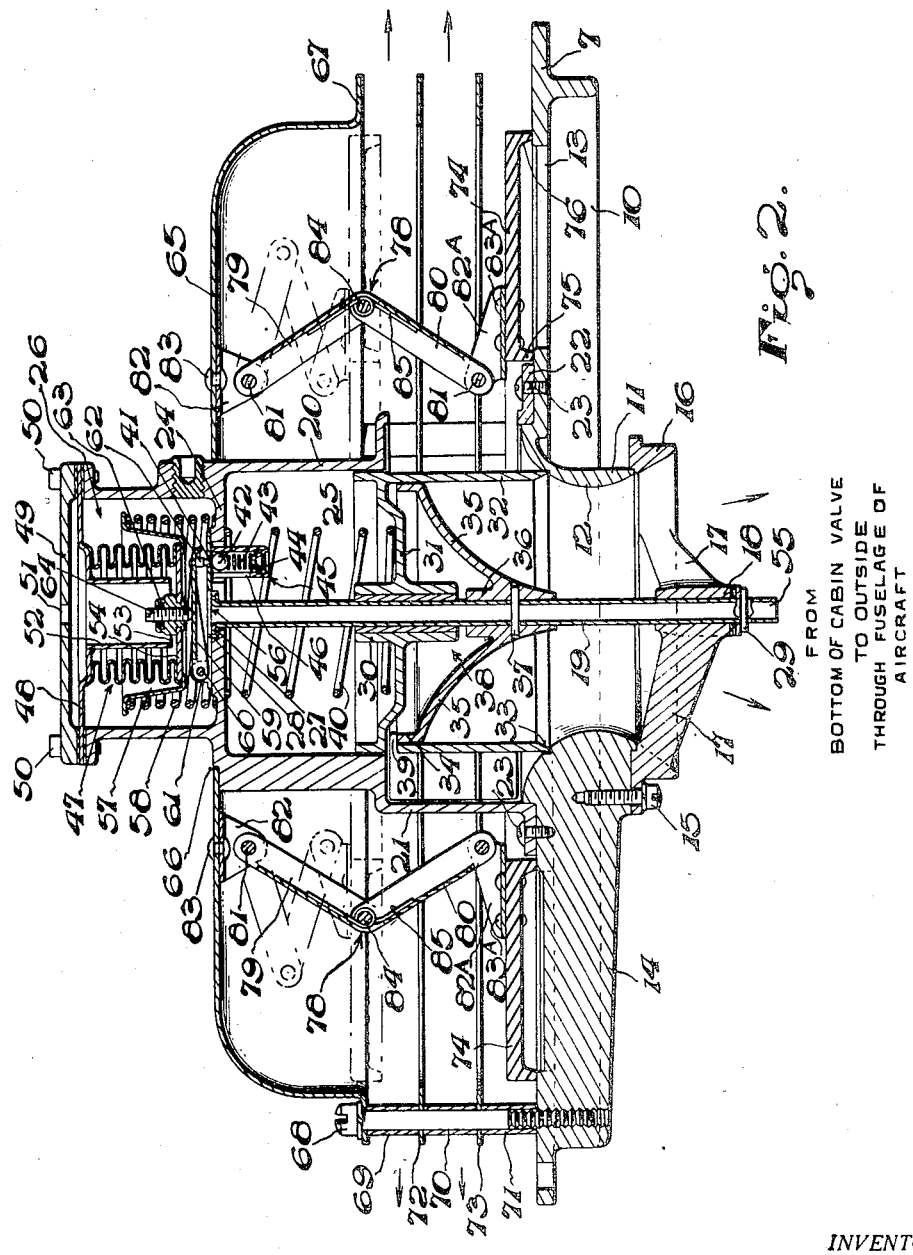
Figure 2 is an enlarged sectional view of the cabin pressure control mechanism of Figure 1 illustrating the operating parts thereof.

Referring to the drawings it will be seen that, as shown schematically at Figure 1, there is provided a supercharger or other air pressure source indicated by the numeral 1 which may be driven by an aircraft engine 2 or other suitable power means.

The supercharger 1 has provided an air inlet conduit indicated by the numeral 3 and a discharge conduit 4 leading to the interior of an aircraft cabin 5. The conduit 4 thus supplies air under pressure to the cabin 5 at a pressure greater than atmospheric pressure. I have further provided a control valve mechanism indicated generally by the numeral 6 arranged to control a suitable opening through the floor or wall of the cabin so as to normally maintain the pressure of the air within the cabin 5 within a predetermined pressure range relative to the pressure of the atmosphere. The control valve mechanism 6, as will be explained hereinafter, is so arranged as to open the cabin to atmospheric pressure upon the value of the cabin pressure rising to a pressure in excess of a predetermined differential above atmospheric pressure so as to thereby decrease the cabin pressure to a safe value. Moreover, the control valve 6 is also arranged to open the cabin to atmospheric pressure upon the relative values of cabin and atmospheric pressure changing so that the atmospheric pressure exceeds the pressure within the cabin 6 by a predetermined value as may occur during diving or other like maneuvers of the plane and thus prevents relative cabin and atmospheric pressures exceeding predetermined safe values.

As best shown in Figures 1 and 2, the control valve mechanism 6 includes a mounting plate 7 which may be affixed to a wall or floor 8 of the aircraft cabin 5 by bolts 9. The plate 7 has formed thereon an annular flange 10 arranged to fit within a suitable opening in the floor 8 of the cabin. A nozzle 11 projects concentrically from the plate 1, outwardly from the interior of the cabin 6. The nozzle 11 has an inner curved surface which is flared at the opposite ends thereof so as to define a nozzle passage 12. An annular opening 13 is formed in the plate 7 and surrounds the nozzle 12 in concentric relation therewith.

Extending across the opening 13 is a rib indicated by the numeral 14 formed integral with the plate 7, nozzle 11 and flange 10 whereby the nozzle 11 is supported in concentric relation to the annular opening 13. Secured to the rib 14 by a screw 15 is a collar 16, which surrounds the outer edge of the nozzle 11. Formed integral with collar 16 are arms 17 which project radially from a sleeve 18 positioned concentrically in the nozzle passage 12 for supporting a tubular member 19 extending longitudinally in the passage 12, as will be explained hereinafter.

Mounted at the inner side of the plate 7 is a cylindrical member 20 supported on the plate 7 by suitable leg members 21 positioned in spaced relation and projecting from an annular plate member 22 fastened to the plate 7 by bolts 23. As shown in Figure 2, the cylindrical member 20 has formed therein a wall 24 separating the cylinder 20 into two chambers 25 and 26.

The tubular member 19 supported by the arms 17 extends longitudinally in the passage 12 through the wall 24 into the chamber 26. The tubular member 19 has provided a shoulder portion 27 which is seated in a recess 28 provided in the wall 24 so as to prevent outward longitudinal movement of the tubular member 19. A pin 29 is fixed in the tubular member 19 so as to engage the outer edge of the sleeve 18 for preventing inward longitudinal movement of the tubular member 19.

The tubular member 19 forms a central guide on which rides a bearing sleeve 30. The bearing sleeve 30 has formed integral therewith a plate 31 to which is affixed a cylindrical gate valve 32 forming a piston longitudinally movable in the cylindrical chamber 25 and slightly spaced from the parallel inner surface of the cylindrical chamber 20 so as to permit a limited leakage of cabin air into the chamber 25 so as to form a pneumatic motor means for adjusting the gate valve 32, as will be explained hereinafter. The cylindrical gate valve 32 is longitudinally movable in relation to the passage 12 and has provided at one end an annular knife-like edge 33 adapted to engage at an acute angle the inner surface of the passage 12.

Mounted within the cylindrical gate valve 32 at the opposite side of the plate 31 from the chamber 25 is a sleeve member 34 having an open end spaced apart from the plate 31 and an opposite end closed by a conical shaped baffle plate 35 which projects longitudinally into the passage 12 and in spaced relation to the inner surface thereof. A sleeve member 36 is positioned concentric with and at the apex of the conical shaped baffle 35. Extending through the sleeve 36 is the tubular member 19 which is affixed to the baffle plate 35 by a suitable fastening pin 37. The cylindrical gate valve 32 slides along the sleeve member 34 defining with the inner surfaces of the baffle plate 35, sleeve 34 and plate 31 a chamber indicated by the numeral 38. A slot 39 opens through the wall of the cylindrical gate valve 32 at a point above the open end of the sleeve member 34 so as to open into the chamber 38. Thus the chamber 38 is open to cabin pressure, as will be explained hereinafter.

A light spring indicated by the numeral 40 bears at one end upon the wall 24 and at its opposite end upon the plate 31 of the sleeve valve 32 so as to normally hold the knife-like edge 33 of the sleeve valve 32 in contacting relation to the inner surface of the passage 12 so as to prevent cabin air from flowing to atmosphere.

As best indicated in Figure 2, the inner surface of the passage 12 is designed for the full rated maximum flow of air, with the conical shaped baffle member 35 sufficiently spaced from the nozzle proper for such flow and with the area normal to the stream progressively decreasing so as to smoothly accelerate the air flow from the cabin into the nozzle passage 12. The sleeve valve 32 as shown contacts the nozzle surface 12, as shown in Figure 2, so as to close the valve.

The cylindrical member 20, as previously described, has provided the leg members 21 which are positioned in spaced relation so that the slot 39 in the sleeve valve 32 and the inner flared end of the nozzle passage 12 is at all times open to cabin pressure.

The chamber 25 communicates with cabin pressure through leakage around the sleeve valve 32, and with the chamber 26 through a bleed valve opening 41 having a ball valve 42 normally biased to a closed position by a spring 43. The spring 43 is held in operating relation by a screw member 44 engaging suitable screw threads formed in a tubular member 45 mounted in the wall 24. The tubular member 45 is arranged to support the ball valve 42 and spring assembly 43, and has provided a slot 46 whereby upon opening of the bleed valve 42 air may freely flow from the chamber 25 to the upper chamber 26. The chamber 26 has suspended therein a bellows 47 affixed to a plate member 48, as shown in Figure 2. The plate 48 extends across the top of the chamber 26 and is held in position between a top plate 49 and the open end of the cylinder 20 by screws 50. A suitable orifice 51 is formed in the top plate 49 so as to open the interior of the bellows 47 to cabin pressure.

A tubular member 52 projects longitudinally from the top plate 48 into the interior of the bellows 47 and has an end 53 opening into the interior of the bellows 47 and serving as a stop for limiting movement of bottom plate 54 of bellows 47, as will be explained.

The tubular member 19 is open at its outer end 55 to atmospheric pressure and at its opposite end 56 opens into the chamber 26 so that atmospheric pressure acts upon the bottom 54 of the bellows 47.

The bellows 47 rests in a cup-like member 57 held by one end of a helical spring 58 which biases the bottom plate 54 of the bellows 47 against the open end 53 of the tubular member 52. The helical spring 58 is supported at its opposite end by the wall 24.

A lever 59 is pivotally connected at 60 to a projecting member 61 which is affixed to wall 24, as shown in Figure 2. The lever 59 has a projecting pin 62 which bears upon the ball valve 42. The ball valve 42 is normally biased to a closed position by the spring 43 previously described. An adjustable set screw indicated by the numeral 63 is provided in the bottom plate 54 of the bellows 47. The set screw 63 is arranged to operate the lever 59 so that upon expansion and contraction of the bellows 42 the lever tends to open and close the bleed valve 41. The set screw 63 has provided a suitable cleft portion 64 whereby the screw 63 may be manually adjusted for calibration purposes by a screw driver or other suitable tool inserted through the orifice 51 and engaging in the cleft portion 64.

Thus upon a difference in atmospheric and cabin pressure less than a predetermined maximum value, the bellows will be biased by atmospheric pressure against the tubular stop 53. Therefore, the bleed valve 41 will be closed under the biasing force of the spring 57, and the pressure in the chamber 25 above the plate 31 will be substantially that of the cabin pressure, since its only outside conduit is to the cabin in the form of the leakage past the outer surface of the gate valve 32 and the inner surface of the cylindrical chamber 25. Thus since the plate 31 of the valve 32 will be subject to cabin pressure in the chamber 25, the spring 40 will tend to hold the sleeve valve 32 in a closed position. However, as the difference between cabin and atmospheric pressures increase to a value in excess of a predetermined maximum value, the bellows 47 under the biasing force of the cabin pressure supplied through the tubular member 52 will cause plate 54 to move away from the end 53 of the tubular member 52, causing the bellows 47 to actuate the arm 59 so as to open the bleed valve 41.

The position of the set screw 63 may be readily adjusted to determine this opening value. The opening of the bleed valve 41 communicates chamber 25 to atmospheric pressure through slot 46, the tubular member 45, bleed valve 41, and tubular member 19. The biasing force of the cabin pressure in chamber 38 acting upon plate 31, counteracts the biasing force of the spring 40 and atmospheric pressure in chamber 25, causing the gate valve 32 to open passage 12 so as to allow air to escape from the cabin and thereby prevent further increase in the difference between cabin and atmospheric pressure. Thus the piston formed by the sleeve 30, plate 31 and cylindrical gate valve 32 provides a motor means for adjusting the gate valve 32.

As shown in Figure 2, there is further provided a casing member 65 which is supported by a shoulder 66 provided on the cylindrical member 20. The casing 65 has further provided an annular flange 67 fastened in spaced relation to the plate 7 by screws 68. The screws 68 have formed suitable sleeve-like spacing members 69, 70 and 71 which support in spaced relation the annular flange 67 and ring-like members 72 and 73.

The annular opening 13 in the plate 7, previously described, is controlled by an annular shaped ring or plate valve 74 formed of suitable rigid plastic or metal material with inner and outer seat portions 75 and 76. The annular ring or plate valve 74 is connected to the inner side of the casing 65 by means of four toggle members 78, only two of which are shown herein. The toggle members 78 are formed of links 79 and 80, the link 79 being pivotally connected at 81 to a bracket 82 fastened to the casing 65 at the inner side thereof by a suitable bolt or rivet 83. The link member 80 is pivotally connected at 81 to a bracket member 82A fastened to the ring valve 74 by suitable rivets or bolts 83A. The link members 79 and 80 are in turn pivotally connected at 84 forming a joint at which point there is provided a spring element 85 which tends to bias the link members 79 and 80 into an extended position, as shown in Figure 2, so as to hold the ring valve 74 on its seat in the absence of a sufficient pressure differential between the cabin and atmospheric pressures. The four toggle joints 78 are so arranged as to allow the ring valve member 74 to move up and down in a straight line but not to permit sideward movement or tipping. The springs 85 are further provided of such strength that if the atmospheric pressure increases above cabin pressure to a predetermined value of, for example, .10 of an inch Hg above cabin pressure the ring valve will be forced wide open, whereupon the cabin pressure will be increased to approach atmospheric pressure. The differential of cabin pressure above atmospheric pressure, however, serves to force the ring valve member 74 more firmly on its seat so as to decrease possible leakage.

As shown in Figure 1, there is provided the supercharger 1 driven by the aircraft engine or any other suitable power means whereby the pressure within the cabin indicated by numeral 5 may be increased above atmospheric pressure so as to avoid harmful physiological effects upon the passengers or crew of the aircraft due to pressure at high altitudes.

The valve indicated generally by the numeral 6, in the illustration of Figure 1, as previously described, will maintain pressure within the cabin and at a predetermined differential above atmospheric pressure. Moreover, upon maneuvering the plane so as to dive rapidly, for example, from a high altitude to a low altitude, the atmospheric pressure will in many cases increase so rapidly as to exceed the pressure within the cabin causing in extreme cases the collapse of the cabin. The ring or plate valve member 74 in my invention, however, will be forced open by the difference between the cabin and atmospheric pressures to permit the equalization of pressure within the cabin to that of atmospheric pressure so as to prevent such unequal stresses from being applied to the cabin walls.

Thus it will be seen that through my invention predetermined upper and lower limits of the cabin pressure in relation to atmospheric pressure may be readily provided.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A mechanism for controlling the pressure within a supercharged aircraft cabin, comprising, in combination, a mounting plate for supporting such mechanism in an opening in the wall of said aircraft cabin, said mounting plate having formed therein a valve opening, a tubular member projecting through said valve opening, a piston valve longitudinally movable on said tubular member for opening and closing said valve opening, a housing having formed therein a cylindrical chamber open at one end thereof, said piston valve longitudinally movable in said cylindrical chamber, spring tension means biasing said piston valve outwardly through the open end of said cylindrical chamber, said piston valve subject to cabin pressure at opposite sides thereof, said housing having formed therein a second chamber, valve means for bleeding cabin pressure from said cylindrical chamber into said second chamber, said tubular member opening said second chamber to atmosphere, whereby the cabin pressure applied at one side of said piston valve may be diminished so that the piston valve may be biased under force of cabin pressure at the opposite side into said cylindrical chamber so as to cause said piston valve to open said first valve opening, and means responsive to changes in atmospheric and cabin pressures for controlling the opening of said valve means.

2. A mechanism for controlling the pressure within a supercharged aircraft cabin, comprising, in combination, a mounting plate for supporting such mechanism in an opening in the wall of said aircraft cabin, said mounting plate having formed therein a first valve opening, a second valve opening, a tubular member projecting through said first valve opening, a piston valve longitudinally movable on said tubular member for opening and closing said first valve opening, a housing having formed therein a cylindrical chamber open at one end thereof, said piston valve longitudinally movable in said cylindrical chamber, spring tension means biasing said piston valve outwardly through said open end, said piston valve subject to cabin pressure at opposite sides thereof, said housing having formed therein a second chamber, valve means for bleeding cabin pressure from said cylindrical chamber into said second chamber, said tubular member opening said second chamber to atmosphere, whereby the cabin pressure applied at one side of said piston valve may be diminished so that the piston valve may be biased under force of cabin pressure at the opposite side into said cylindrical chamber so as to cause said piston valve to open said first valve opening, and means responsive to changes in atmospheric and cabin pressures for controlling the opening of said valve means, a plate valve controlling said second valve opening, spring toggle operating means for biasing said plate valve so as to close the second valve opening, and said plate valve arranged to open the second valve opening upon the atmospheric pressure exceeding the cabin pressure by a predetermined value.

3. A mechanism for controlling the pressures within a supercharged aircraft cabin, comprising, in combination, a piston valve for regulating a valve opening, a housing having a first chamber formed therein and open at one end thereof, said piston valve longitudinally movable in said first chamber for opening and closing said valve opening, spring means biasing said piston valve outwardly through the open end of said first chamber in a valve closing direction, said piston valve subject to cabin pressure at opposite sides thereof, said housing having a second chamber formed therein, a bellows mounted in said second chamber, the interior of said bellows open to cabin pressure, a tubular member projecting through said valve opening and slidably supporting said valve member, said tubular member opening the second chamber to atmospheric pressure so as to cause atmospheric pressure to be applied to the exterior surface of said bellows, valve means to bleed cabin pressure from said first chamber and at one side of said piston to the second chamber, and said valve means operatively controlled by said bellows so as to regulate said piston valve.

4. A mechanism for controlling the pressure within a supercharged aircraft cabin, comprising, in combination, a mounting plate having a first valve opening and a second valve opening extending about the first valve opening, a first valve member for controlling the first valve opening, motor means for positioning the first valve member, means responsive to said cabin pressure for controlling the motor means, an annular plate for controlling the second valve opening, and spring means biasing said annular plate in a direction for closing said second valve opening against atmospheric pressure, and said annular plate biased to a valve opening position upon the atmospheric pressure exceeding the cabin pressure by a predetermined value.

5. A mechanism for controlling the pressure within a supercharged aircraft cabin, comprising, in combination, a mounting plate for supporting such mechanism in an opening in the wall of said aircraft cabin, said mounting plate having formed therein a first valve opening and a second valve opening extending about the first valve opening, a first valve member for opening and closing said first valve opening, first spring means carried by said plate for biasing the first valve member to a closed position against cabin pressure, said first valve member arranged so as to open under excessive cabin pressure, a second valve member in the form of an annular plate for opening and closing said second valve opening, a second spring means carried by said plate for biasing the second valve member to a closed position against atmospheric pressure, and said second valve member being so arranged as to be differentially effected by cabin and atmospheric pressures so as to open said second valve opening upon atmospheric pressure exceeding the cabin pressure by a predetermined value.

6. A mechanism for control of aircraft cabin pressure, comprising in combination, valve means including a valve opening, a tubular member projecting through said valve opening, a valve member longitudinally movable on said tubular member and mounted for movement relative to the tubular member for regulating said valve opening, a cylinder element, a piston element for operating said valve member and slidably mounted in said cylinder element, at least one of said elements providing a passage to permit a fluid leakage to one side of the piston element from the other side thereof, said piston element subject at said other side to cabin pressure, a second valve located in the wall of said cylinder element at the one side of said piston element and arranged to bleed the leakage fluid from the one side of said piston element and to the atmosphere through said tubular member so as to effect movement of said valve member under cabin pressure in a valve opening direction, a spring biasing said valve member in a valve closing direction, a fluid pressure responsive membrane for controlling the opening of said second valve so as to regulate the operation of said valve member, one side of said membrane subject to cabin pressure and the opposite side of said membrane subject to atmospheric pressure applied through said tubular member.

WALTER D. TEAGUE, Jr.

REFERENCES CITED

The following references are of record in the file of this patent:

UNITED STATES PATENTS

| Number | Name | Date |
|---|---|---|
| 1,240,461 | Leinert | Sept. 18, 1917 |
| 1,760,067 | Joyce | May 27, 1930 |
| 2,002,057 | Gregg | May 21, 1935 |
| 2,208,554 | Price | July 16, 1940 |
| 2,307,199 | Cooper | Jan. 5, 1943 |
| 2,316,237 | Grunert et al. | Apr. 13, 1943 |
| 2,316,416 | Gregg | Apr. 13, 1943 |
| 2,396,116 | Noxon | Mar. 5, 1946 |
| 2,399,326 | Crot | Apr. 30, 1946 |

FOREIGN PATENTS

| Number | Country | Date |
|---|---|---|
| 521,623 | Great Britain | May 27, 1940 |